United States Patent
Beausoleil, Jr. et al.

(10) Patent No.: US 7,038,188 B2
(45) Date of Patent: May 2, 2006

(54) NON-DEMOLITION PHOTON DETECTOR THAT PRESERVES INPUT STATE CHARACTERISTICS

(75) Inventors: Raymond G. Beausoleil, Jr., Redmond, WA (US); William J. Munro, Bristol (GB); Timothy P. Spiller, Bristol (GB); Kae Nemoto, Tokyo (JP); Sean D. Barrett, Bristol (GB)

(73) Assignee: Hewlett-Packard Development Company, LP., Houston, TX (US)

( * ) Notice: Subject to any disclaimer, the term of this patent is extended or adjusted under 35 U.S.C. 154(b) by 223 days.

(21) Appl. No.: 10/836,012

(22) Filed: Apr. 29, 2004

(65) Prior Publication Data

US 2004/0200952 A1    Oct. 14, 2004

Related U.S. Application Data

(63) Continuation-in-part of application No. 10/678,437, filed on Oct. 3, 2003, which is a continuation-in-part of application No. 10/412,019, filed on Apr. 11, 2003, now Pat. No. 6,989,523.

(51) Int. Cl.
*H01L 31/00* (2006.01)

(52) U.S. Cl. ............................ 250/214.1; 250/227.19
(58) Field of Classification Search ............ 250/214.1, 250/277.19

See application file for complete search history.

(56) References Cited

U.S. PATENT DOCUMENTS 4,681,395 A * 7/1987 Lindsay et al. ............... 385/12
5,740,117 A    4/1998 Bona et al.

OTHER PUBLICATIONS

Chiao, Raymond Y. and Milonni, Peter W., "Fast Light, Slow Light," Optics and Photonics News, pp. 26-30 (Jun. 2002).

D'Ariano, G.M. et al., "State Preparation By Photon Filtering," arXiv:quant-ph/9906077v1, pp. 1-9 (Jun. 21, 1999).

Juzeliunas, G. et al., "Storing and Releasing Light in a Gas of Moving Atoms," arXiv:quant-ph/0210123v1, pp. 1-4 (Oct. 16, 2002).

Langford, Nathan K. et al., "Entangled qutrits: production and characterisation" arXiv:quant-ph/0312072v1, pp. 1-5 (Dec. 9, 2003).

(Continued)

*Primary Examiner*—Que T. Le

(57) ABSTRACT

A device capable of efficiently detecting a single-photon signal preserves a photon characteristic such as polarization or angular momentum. The device can include a beam splitter that splits an input photon state into modes that are distinguished by states of a characteristic of signal photons in the input photon state, a non-destructive measurement system capable of measuring a total number of photons in the modes without identifying a photon number for any individual one of the modes; and a beam combiner positioned to combine the modes after output from the non-destructive detection system.

18 Claims, 6 Drawing Sheets

OTHER PUBLICATIONS

Leonhardt, Ulf, "A Primer to Slow Light," arXiv:gr-qc/0108085v2, pp. 1-20 (Jan. 9, 2002).

Lloyd, Seth et al., "Quantum Computation Over Continuous Variables," Physical Review Letters, vol. 82, No. 8, pp. 1784-1787 (Feb. 22, 1999).

Mair, A lois et al., "Entanglement of Orbital Angular Momentum States of Photons" arXiv:quant-ph/0104070v3, pp. 1-15 (Feb. 21, 2002).

Pittman, T.B. and Franson, J.D., "Cyclical Quantum Memory for Photonic Qubits," pp. 1-4 (Jul. 8, 2002).

Rostov tsev, Yuri et al., "Slow, Ultraslow, Stored, and Frozen Light," Optics and Photonics News, pp. 44-48 (Jun. 2002).

Wang, Hai et al., "Enhanced Kerr Nonlinearity via Atomic Coherence in a Three-Level Atomic System," Physical Review Letters vol. 87, No. 7, pp. 073601-1 to 073601-4 (Aug. 13, 2001).

* cited by examiner

NON-DEMOLITION PHOTON DETECTOR THAT PRESERVES INPUT STATE CHARACTERISTICS

This patent document is a continuation-in-part and claims benefit of the earlier filing date of U.S. patent application Ser. No. 10/678,437, entitled "Detecting One or More Photons from Their Interactions with Probe Photons in a Matter System", filed Oct. 3, 2003, which is a continuation-in-part and claims benefit of the earlier filing date of U.S. patent application Ser. No. 10/412,019, entitled "Photon Number Resolving Systems and Methods", filed Apr. 11, 2003, now U.S. Pat. No. 6,989,523 which are hereby incorporated by reference in its entirety.

BACKGROUND

Interest in quantum information processing has grown dramatically because of recent successes in developing quantum systems and the expected capabilities of the technology. In particular, working quantum cryptosystems have been developed, and if large (many qubit) quantum computers can be built, quantum computers will perform many processing tasks much more efficiently than can classical computers. Quantum processors having tens or hundreds of qubits, for example, would be able to perform quantum simulations unreachable with any classical machine. Such quantum processors also have the potential to extend the working distances and applicability of quantum communications.

Many candidate technologies for quantum computing hardware are currently being studied. Whichever technology turns out to be the most practical, quantum coherent communications will likely be needed for linking separate quantum computers. Coherent electromagnetic fields (as photonic qubits) seem ideal for communications between quantum computers and for general quantum communications because light, traveling either down optical fibers or through free space, can carry quantum information over large distances. Further, some quantum computing may be performed directly on photonic qubits, using non-linear or linear quantum optical processes.

Proposed quantum information systems that use photon states often require detectors capable of efficiently detecting the presence or absence of one or a few photons. One proposed optical quantum computation architecture by E. Knill, R. Laflamme, and G. Milburn, Nature 409, 46 (2001), for example, requires a high-efficiency photon detector that is more than 99.99% efficient at distinguishing quantum states including 0, 1, or 2 photons. A miscount of the number of photons or a failure to detect the presence of a photon causes an inaccurate measurement of the photon state and an error in evaluation of the quantum information. Such errors, when tolerable, require error correction schemes that may be expensive to implement.

Current commercial single photon detectors generally rely to a greater or lesser extent on the photoelectric effect. With the photoelectric effect, photons incident on the surface of a metal, a semiconductor, or another material liberate electrons from atoms of the material. The excited electrons enter the surrounding space or a conduction band, where the electrons are collected as current that can be amplified and measured.

The photoelectric current from a single photon is small and difficult to detect. The best commercial photon detectors for visible light currently have a quantum efficiency of about 90% for detecting single photons, and the efficiency achieved in practice is much lower. At present, detectors for single photons having wavelengths between 1.3 and 1.5 µm are only about 30% efficient. These efficiencies are too low for many quantum information systems. Additionally, the best efficiencies achieved for the visible-spectrum photon detectors require cooling the detectors down to about 6° K, and such detectors still provide relatively high "dark count" rates (e.g., high background noise when no photon is incident.)

Another drawback of most current photon detectors is that the detectors absorb the photons being measured or detected. The photon detectors can thus only be used at the end of a process, when the measured photons are no longer required or when the resulting measurement controls a condition of the system.

Accordingly, quantum information systems require photon detectors that are highly efficient at detecting photons and that can accurately distinguish the number of photons in a quantum signal. Ideally, the detectors would be non-destructive, so that after the presence or number of photons has been inferred, the photon states could be used thus providing more efficient use of resources.

SUMMARY

In accordance with an embodiment of the invention, a non-destructive photon detector can detect the photon number of an input state without changing a characteristic such as the polarization or angular momentum of the input state.

BRIEF DESCRIPTION OF THE DRAWINGS

Use of the same reference symbols in different Figures indicates similar or identical items.

DETAILED DESCRIPTION

In accordance with an aspect of the invention, a non-destructive photon detector uses the interactions of a probe state and a signal state with a matter system to create changes in the probe state that depend on the number of photons in the signal photon state. The matter system generally includes one or more atoms, molecules, or other quantum systems having energy level transitions respectively corresponding to the energies of photons in the probe state, the signal states, and a control field. The interactions of the photons and the matter system causes electromagnetically induced transparency (EIT) that introduces phase shifts in Fock components of the probe state without destroying the signal photons. In one embodiment, the probe state is initially in a low intensity coherent state, and the matter system transforms the probe state from a coherent state to a state that is no longer a coherent state. A homodyne or heterodyne measurement system can measure the changes in the probe state for determination of the number of photons in the signal state (e.g., whether the signal state contains 0 or 1 photon).

Figure 1:
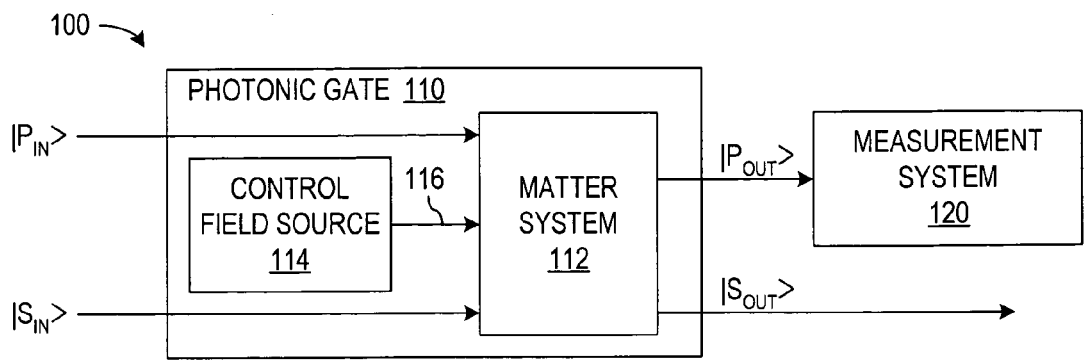
FIG. 1 is a block diagram of a number-resolving photon detector in accordance with an embodiment of the invention.

FIG. 1 illustrates a photon detector 100 in accordance with an embodiment of the invention. Photon detector 100 includes a photonic gate 110 and a measurement system 120. For a measurement, a photonic signal state $|S_{IN}\rangle$ and a photonic probe state $|P_{IN}\rangle$ are input to photonic gate 110, where the photon states interact before exiting as evolved states $|S_{OUT}\rangle$ and $|P_{OUT}\rangle$. Photonic gate 110 is preferably such that the interaction of photon states $|S_{IN}\rangle$ and $|P_{IN}\rangle$ in photonic gate 110 causes a phase shift in probe state $|P_{IN}\rangle$, and the introduced phase shift depends on the number of photons in signal state $|S_{IN}\rangle$. However, output probe state $|P_{OUT}\rangle$ may alternatively differ in intensity or some other measurable property from input probe state $|P_{IN}\rangle$. In one alternative embodiment, photonic gate 110 causes scattering of a portion of probe state $|P_{IN}\rangle$ where the scattering depends on the number of photons in signal state $|S_{IN}\rangle$.

Measurement system 120 can use homodyne or heterodyne measurement techniques to measure output probe photon state $|P_{OUT}\rangle$ and determine the change that arose in photonic gate 110. The number of photons in signal state $|S_{OUT}\rangle$ is then inferred from the measurement of probe state $|P_{OUT}\rangle$. Signal state $|S_{OUT}\rangle$, which is output from photonic gate 120, is thus in a Fock state, i.e., in a quantum state having a determined photon number. Input signal state $|S_{IN}\rangle$ could have been originally in a Fock state, in which case the input and output signal state have the same photon number, or input signal state $|S_{IN}\rangle$ could have been in a state that is a superposition of Fock states, in which case the measurement collapses input signal state $|S_{IN}\rangle$ to output signal state $|S_{OUT}\rangle$.

The specific embodiment of photonic gate 110 illustrated in FIG. 1 uses a matter system 112 and a control field source 114 suitable for providing electromagnetically induced transparency (EIT). EIT is a well-known phenomenon in which an atom, molecule, or other condensed matter system that would normally absorb photons of a particular frequency is made transparent to the photons of that frequency through application of one or more electromagnetic fields having other frequencies. EIT generally requires a matter system having at least three quantum energy levels that are available for interactions with photons.

Figure 2A:
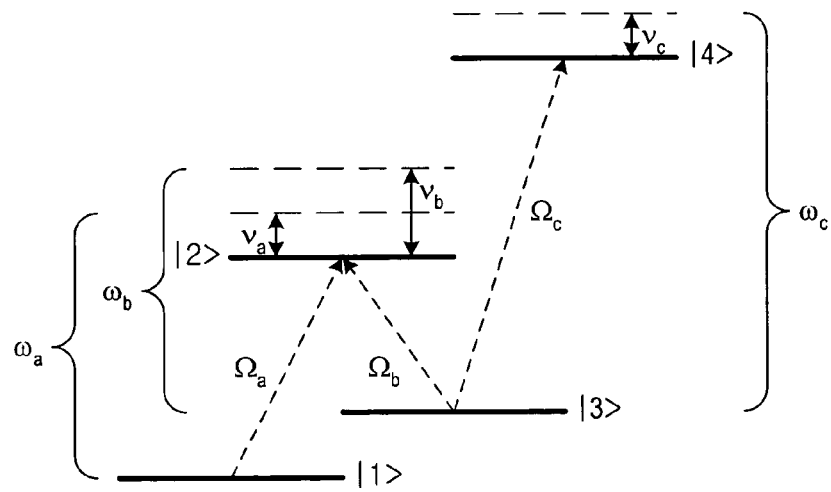
FIGS. 2A and 2B respectively illustrate semi-classical energy levels and a quantum energy manifold for a matter system suitable for use in the photon detector of FIG. 1.

In an exemplary embodiment, matter system 112 includes at least one atom, molecule, or other quantum system having four or more energy levels, and the angular frequencies $\omega_a$, $\omega_b$, and $\omega_c$ respectively of signal state $|S_{IN}\rangle$, a control field 116, and probe state $|P_{IN}\rangle$ are such that the photons couple to corresponding transitions between the quantum energy levels of matter system 112. FIG. 2A illustrates the energy levels of energy states $|1\rangle$, $|2\rangle$, $|3\rangle$, and $|4\rangle$ of a four-level matter system relative to the energies of photons having angular frequencies $\omega_a$, $\omega_b$, and $\omega_c$. With the matter system of FIG. 2A, photons of angular frequency $\omega_a$ couple atomic energy state $|1\rangle$ to energy state $|2\rangle$. Photons of angular frequency $\omega_b$ and $\omega_c$ couple the metastable energy state $|3\rangle$ to energy states $|2\rangle$ and $|4\rangle$, respectively.

The relative order of the energy levels illustrated in FIG. 2A is merely an example, and more generally, a reordering of energy levels would still permit EIT. In particular, although FIG. 2A shows the fourth energy state $|4\rangle$ as being higher in energy than the second energy state $|2\rangle$, the second state $|2\rangle$ as being higher in energy than the third energy state $|3\rangle$, and the third energy state $|3\rangle$ as being higher in energy than the first energy state $|1\rangle$, EIT can be produced in matter systems that provides other orderings of these energy levels.

Third energy state $|3\rangle$ is metastable in that no single-photon spontaneous emission is permitted during the time scale of the detection. Such metastability may result, for example, if the spin/angular momentum of energy state $|3\rangle$ and available lower energy states (e.g., state $|1\rangle$) is such that a conservation law forbids emission of a single photon during a transition of the matter system from energy state $|3\rangle$ to a lower energy state. Spontaneous transitions from the fourth energy state $|4\rangle$ (e.g., to the first energy state $|1\rangle$ or the second state $|2\rangle$) is suppressed by selecting a matter system for which the fourth energy state $|4\rangle$ is metastable or by at least partially surrounding the four-level matter system with a photonic bandgap crystal that does not permit propagation of photons having angular frequencies corresponding to the transitions from the fourth energy state $|4\rangle$.

Detuning parameters $\nu_a$, $\nu_b$, and $\nu_c$ indicated the respective amount of detuning of angular frequencies $\omega_a$, $\omega_b$, and $\omega_c$ from resonances of the energy level transitions of matter system as indicated in Equations 1. In Equations 1, the energy differences between states $|1\rangle$ and $|2\rangle$, between $|3\rangle$ and $|2\rangle$, and between $|3\rangle$ and $|4\rangle$ are $\omega_{12}$, $\omega_{32}$, and $\omega_{34}$, respectively, where is the reduced Plank constant.

Figure 2B:
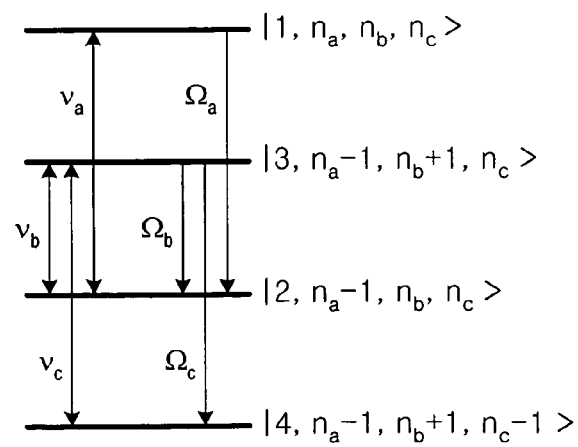

Equations 1:

$\omega_a = (\omega_{12} + \nu_a)$ $\omega_b = (\omega_{32} + \nu_b)$ $\omega_c = (\omega_{34} + \nu_c)$ FIG. 2B shows a manifold corresponding to product states $|X, A, B, C\rangle$ of the matter system with free photons of angular frequencies $\omega_a$, $\omega_b$, and $\omega_c$. In product state $|X, A, B, C\rangle$, X indicates the energy level 1 to 4 of the matter system, and A, B, and C indicate the numbers of photons of angular frequencies $\omega_a$, $\omega_b$, and $\omega_c$, respectively. The illustrated manifold includes the states closest in energy to a matter system in energy state $|1\rangle$ with $n_a$ photons of angular frequency $\omega_a$, $n_b$ photons of angular frequency $\omega_b$, and $n_c$ photons of angular frequency $\omega_c$. The product states of the system include a series of manifolds that are similar to FIG. 2B but with different numbers of free photons. The manifold of FIG. 2B illustrates that when the detuning parameters are small, a system in state $|2, n_a-1, n_b, n_c\rangle$ can transition to state $|1, n_a, n_b, n_c\rangle$ by a spontaneous emission of a single photon, but the matter system does not permit transitions from states $|3, n_a-1, n_b+1, n_c\rangle$ and $|4, n_a-1, n_b+1, n_c-1\rangle$ to state $|1, n_a, n_b, n_c\rangle$ by spontaneous emission of a single photon.

A paper by R. Beausoleil, W. Munro, and T. Spiller entitled "Applications of Coherent Population Transfer to Information Processing," "http://xxx.lanl.gov/abs/quant-ph/0302109" and a co-owned U.S. patent application Ser. No. 10/364,987, entitled "Quantum Information Processing Using Electromagnetically Induced Transparency", which are hereby incorporated by reference in their entirety, further describe use of four-level matter systems having energy level states as illustrated in FIGS. 2A and 2B in implementations of photonic qubit gates. The incorporated references particularly describe the structure of a two-qubit phase gate suitable for use as photonic gate 10 in FIG. 1.

The four-level matter system of FIG. 2A when pumped with photons of angular frequency $\omega_b$ mediates an interaction between photons of angular frequencies $\omega_a$ and $\omega_c$. The resulting interaction has a Hamiltonian H with an optical non-linearity that under conditions set forth in the above-cited paper of Beausoleil et al. has the form given by Equation 2A. In Equation 2A, creation operator $\hat{a}^\dagger$ and annihilation operator $\hat{a}$ respectively create and destroy a photon of angular frequency $\omega_a$, and creation operator $\hat{c}^\dagger$ and annihilation operator $\hat{c}$ respectively create and destroy a photon of angular frequency $\omega_c$. Constant $\chi$ indicates the strength of the interaction and generally depends on detuning parameters $\nu_a$, $\nu_b$, and $\nu_c$, the Rabi frequencies $\Omega_a$, $\Omega_b$, and $\Omega_c$ associated with transitions, and the specific characteristics of the matter system.

$$H = \chi \hat{a}^\dagger \hat{a} \hat{c}^\dagger \hat{c}$$ Equation 2A

Condensed matter systems can more generally give rise to other non-linear photon interactions that are suitable for use in detectors. Equation 2B, for example, illustrates a more general representation of a term of a Hamiltonian providing a non-linear interaction between photons of angular frequencies $\omega_a$ and $\omega_c$. In Equation 2B, $f(\hat{a}^\dagger, \hat{a})$ is a function of creation and annihilation operators $\hat{a}^\dagger$ and $\hat{a}$, and $g(\hat{c}^\dagger, \hat{c})$ is a function of creation and annihilation operators $\hat{c}^\dagger$ and $\hat{c}$. Preferably, $f(\hat{a}^\dagger, \hat{a})$ is a power of photon number operator $\hat{a}^\dagger \hat{a}$, e.g., $(\hat{a}^\dagger, \hat{a})^\lambda$ for some constant $\lambda$, so that the effect of the interaction on the state of photons of angular frequency $\omega_c$ directly depends on the number of photons of angular frequency $\omega_a$.

$$H = \chi \cdot f(\hat{a}^\dagger, \hat{a}) \cdot g(\hat{c}^\dagger, \hat{c})$$ Equation 2B:

Optical systems or gates that provide a general non-linear interaction between photon states in two distinct modes (e.g., spatially separated modes or distinct angular frequency modes $\omega_a$ and $\omega_c$) may be built from a sequence of optical gates, with or without using an EIT system. In the context of quantum computing, Seth Lloyd and Samuel L. Braunstein, "Quantum Computations over Continuous Variables," Phys. Rev. Lett. 82, 1784 (1999), which is hereby incorporated by reference in its entirety, describes constructing a sequence of gates that creates an arbitrary polynomial Hamiltonian (e.g., $f(\hat{a}^\dagger, \hat{a})$ or $g(\hat{c}^\dagger, \hat{c})$) for a single photon mode. The basic gates in the sequence for a single mode include (1) linear devices such as beam splitters and phase shifters, (2) quadratic devices such as squeezers, and (3) non-linear devices of third or higher order such as Kerr-effect fibers, atoms in optical cavities, and non-linearities generated through measurement. Such systems for two separate modes can be combined via one or more beam splitters to provide cross mode interactions and create a desired non-linear interaction $f(\hat{a}^\dagger, \hat{a}) g(\hat{c}^\dagger, \hat{c})$ between the modes.

Figure 3:
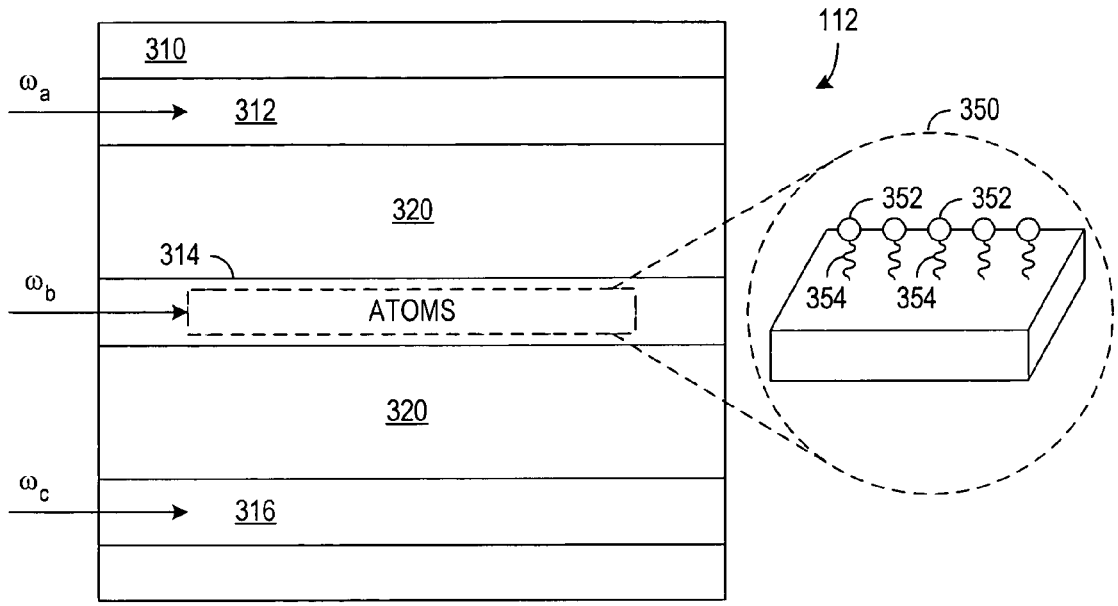
FIG. 3 illustrates an exemplary embodiment of a matter system suitable for the photon detector of FIG. 1.

In an exemplary embodiment of detector 100 described herein, matter system 112 includes one or more four-level atoms or molecules having quantum energy levels related to the photon energies as illustrated in FIG. 2A and therefore provides a crossed-Kerr non-linearity of the form given in Equation 2A. FIG. 3 illustrates an embodiment of matter system 112. In the illustrated embodiment, matter system 112 includes a substrate 310 containing waveguides 312, 314, and 316. Waveguides 312, 314, and 316 respectively receive light beams having angular frequencies $\omega_a$, $\omega_b$, and $\omega_c$.

Confinement structures 354 attach a series of four-level atoms 352 to the central waveguide 314. Each confinement structure 354 can be a molecular tether or other similar structure that reduces thermal vibrations of a four-level atom 352, and in one specific embodiment, confinement structures 354 are carbon fullerenes that act to cage four-level atoms 352. Each atom 352 can be any atom that provides four accessible energy levels having the above-described relations, and atoms 352 may be, for example, atoms of a lanthanide series metal such as erbium (Er) or praseodymium (Pr), an alkali metal such as rubidium (Rb) or cesium (Cs), or an alkaline earth metal. In a typical system, a few hundred atoms 352 may be needed to achieve a desired phase shift in the probe state.

The spacing of atoms 352 relative to waveguides 312, 314, and 316 is such that atoms 352 interact with the evanescent fields surrounding waveguides 312, 314, and 316. The interaction causes EIT with a phase shift resulting in the probe photons of angular frequency $\omega_c$. Material 320 around atoms 352 can form a photonic bandgap crystal that prevents propagation of photons corresponding to spontaneous emissions from the fourth energy level of atoms 352. However, a defect or other structure between atoms 352 and waveguides 312 and 316 may be provided to increase the interaction of atoms 352 with photons from waveguide 316, which have angular frequency $\omega_c$.

The exemplary embodiment of detector 100 of FIG. 1 can distinguish state $|0\rangle_a$ from state $|1\rangle_a$ if signal state $|S_{IN}\rangle$ is in the Fock state $|0\rangle_a$ or $|1\rangle_a$, i.e., a state including zero or one photon of angular frequency $\omega_a$. More generally, signal state $|S_{IN}\rangle$ could contain up to n photons (where n is arbitrary), and detector 100 can efficiently determine the number n of photons. For the determination of the number of photons of angular frequency $\omega_a$ in signal state $|S_{IN}\rangle$, a laser or other control field source 114 drives control field 116 at angular frequency $\omega_b$, which corresponds to the transition between the second and third energy levels of the four-level atom. Probe state $|P_{IN}\rangle$ can be a Fock state, a coherent state, or a squeezed state containing easily measured number (e.g., 10 to $10^5$ or more) of photons of angular frequency $\omega_c$, which corresponds to the transition between the third and fourth energy levels of the four-level atom. Alternatively, the roles of angular frequencies $\omega_a$ and $\omega_c$ can be interchanged because of the symmetry of the Hamiltonian term of Equation 2A.

In one exemplary embodiment described below, probe state $|P_{IN}\rangle$ is a coherent state $|\alpha\rangle_c$. The coherent state $|\alpha\rangle_c$ is used as an example since coherent states are easily produced (or approximated) by the output from a laser. However, other types of photonic states such as squeezed states or Fock states could equally be employed as probe state $|P_{IN}\rangle$.

Equations 3 mathematically represent coherent state $|\alpha\rangle_c$ in terms of Fock states $|n\rangle_c$ having definite numbers of photons of angular frequency $\omega_c$. In Equations 3, $\alpha$ represents the state amplitude, the subscript c designates that the state contains photons of angular frequency $\omega_c$, $|n\rangle_c$ is a Fock state containing n photons of angular frequency $\omega_c$, and $n_\nu$ is the expectation value of the number of photon in the coherent state $|\alpha\rangle_c$.

Equations 3:

$$|\alpha\rangle_c = e^{-\frac{1}{2}|\alpha(t)|^2} \sum_{n=0}^{\infty} \frac{\alpha^n(t)}{\sqrt{n!}} |n\rangle_c$$

-continued $$\alpha(t) = \sqrt{\langle n_V \rangle}\, e^{-i\varpi_c t}$$

When probe state $|P_{IN}\rangle$ is a coherent state $|\alpha\rangle_c$ and the signal state $|S_{IN}\rangle$ is a Fock state containing n photons, the initial state $|S_{IN}\rangle|P_{IN}\rangle$ of detector 100 is $|n\rangle_a|\alpha\rangle_c$, where subscripts a and c respectively represent photons of angular frequencies $\omega_a$ and $\omega_c$. (For this approximation, control field source 114 classically pumps four-level matter system 112 with photons of angular frequency $\omega_b$.) The effect of the crossed-Kerr non-linearity of Equation 2A now causes the photon states to evolve in time according to Equation 4.

$$|S_{OUT}\rangle|P_{OUT}\rangle = \exp\{i\chi t \hat{a}^\dagger \hat{a} \hat{c}^\dagger \hat{c}\}|n\rangle_a|\alpha\rangle_c = |n\rangle_a|\alpha e^{in\chi t}\rangle_c \quad \text{Equation 4:}$$

Equation 4 clearly shows that if no photon of angular frequency $\omega_a$ is present (n=0) in signal state $|S_{IN}\rangle$ then no phase shift occurs ($e^{in\chi t}=1$). However, if one (or more) photon of angular frequency $\omega_a$ is present in signal state $|S_{IN}\rangle$, coherent state $|\alpha\rangle_c$ evolves to $|\alpha e^{in\chi t}\rangle_c$. The size of the phase shift $e^{in\chi t}$ depends directly on the number n of photons in signal state $|S_{IN}\rangle$ as well as on coupling $\chi$ and the interaction time t of the photons with the four-level matter systems. To increase the size of the phase shift, the interaction time t can be effectively increased by increasing the number of four-level atoms or molecules that interact with states $|S_{IN}\rangle$ and $|P_{IN}\rangle$, e.g., by increasing the number of interacting four-level atoms in the optical path of the photon states $|S_{IN}\rangle$ and $|P_{IN}\rangle$. Since the coupling $\chi$ and interaction time t can be fixed and known for a particular system, a measurement of the phase shift indicates the number n of photons in signal state $|S_{IN}\rangle$.

Figure 4A:
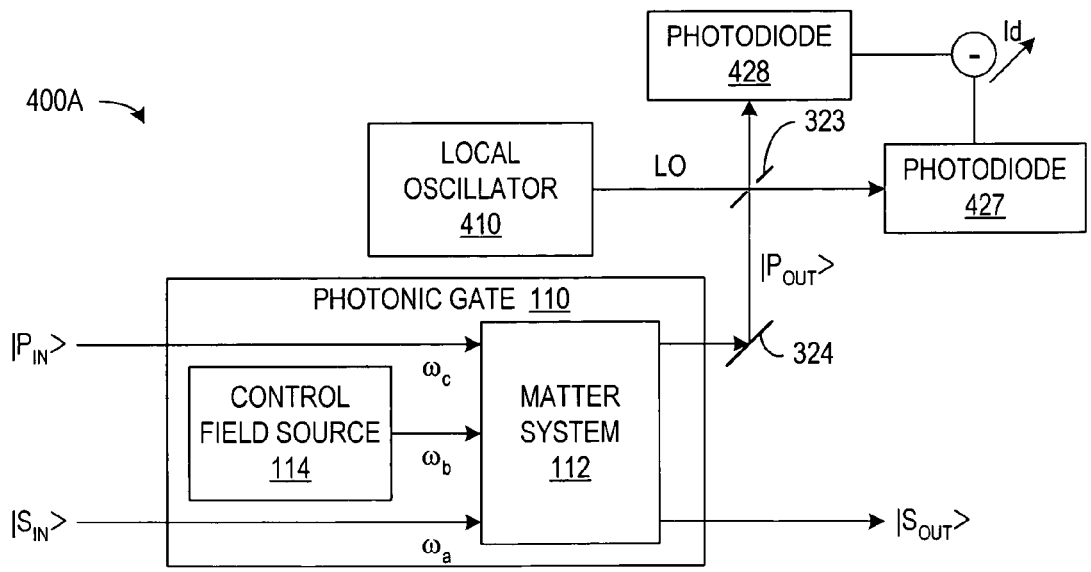
FIGS. 4A, 4B, 4C, and 4D are block diagrams of number-resolving photon detectors in accordance with embodiments of the invention using alternative homodyne or heterodyne measurement techniques to measure changes in probe photon states.

If value a for the coherent state is initially real, a measurement system 400A of FIG. 4A can use homodyne measurement techniques to measure the position $X=\hat{c}+\hat{c}^\dagger$ and momentum $Y=(\hat{c}-\hat{c}^\dagger)/i$ quadratures $\langle X \rangle$ and $\langle Y \rangle$ for probe state $|P_{OUT}\rangle$. The homodyne measurement in system 400A uses an oscillator or laser 410 to generate a reference beam LO that is out of phase with probe state $|P_{OUT}\rangle$ by a phase angle $\theta$. An adjustable delay element can be placed in the path of the reference beam LO to allow adjustment of phase angle $\theta$. A 50/50 beam splitter 423 at the intersection of the two beams causes subtraction of reference beam LO from probe state $|P_{OUT}\rangle$ along a path to a photodiode 427 and addition of reference beam LO to probe state $|P_{OUT}\rangle$ along a path to a photodiode 428. A difference Id in the resulting currents of photodiodes 427 and 428 is proportional to position quadrature $\langle X \rangle$ when phase angle $\theta$ is zero and is proportional to momentum quadrature $\langle Y \rangle$ when phase angle $\theta$ is $\pi/2$.

Based on Equation 4, the measured quadratures $\langle X \rangle$ and $\langle Y \rangle$ are related to the number n of photons in signal state $|S_{IN}\rangle$ (and to the constants $\alpha$, $\chi$, and t) as respectively indicated in Equations 5 and 6.

$$\langle X \rangle = 2\alpha \cos(n\chi t) \quad \text{Equation 5:}$$

$$\langle Y \rangle = 2\alpha \sin(n\chi t) \quad \text{Equation 6:}$$

If no photon of angular frequency $\omega_a$ is present (n=0), the measured position quadrature $\langle X \rangle$ is equal to twice value $\alpha$, and measured momentum quadrature $\langle Y \rangle$ is zero. If one photon of angular frequency $\omega_a$ is present (n=1), interaction time t can be controlled so that quadrature $\langle X \rangle$ is zero and quadrature $\langle Y \rangle$ is $2\alpha$. (The interaction time t can be controlled, for example, through the number of four-level atoms or molecules in matter system 112 and/or through adjustment of detuning parameters $v_a$, $v_b$, and $v_c$.) Thus, for an appropriately controlled reaction time t, measured quadratures $\langle X \rangle$ and $\langle Y \rangle$ provide definite and easily distinguished signatures indicating the presence or absence of a photon.

The interaction time t is not required to be such that $\sin(n\chi t)$ is unity. If the product $\chi t$ is small enough that the small angle approximation applies to Equation 6, the momentum quadrature $\langle Y \rangle$ is approximately $2\alpha\chi t$ for a single photon of angular momentum $\omega_a$ in signal state $|S_{IN}\rangle$. If parameter $\alpha$ is sufficiently large, the measurement of quadrature $\langle Y \rangle$, which is about $2\alpha\chi t$, will be much larger than signal noise, and the one-photon signal state is efficiently distinguished from the signal state containing no photons.

Figure 4B:
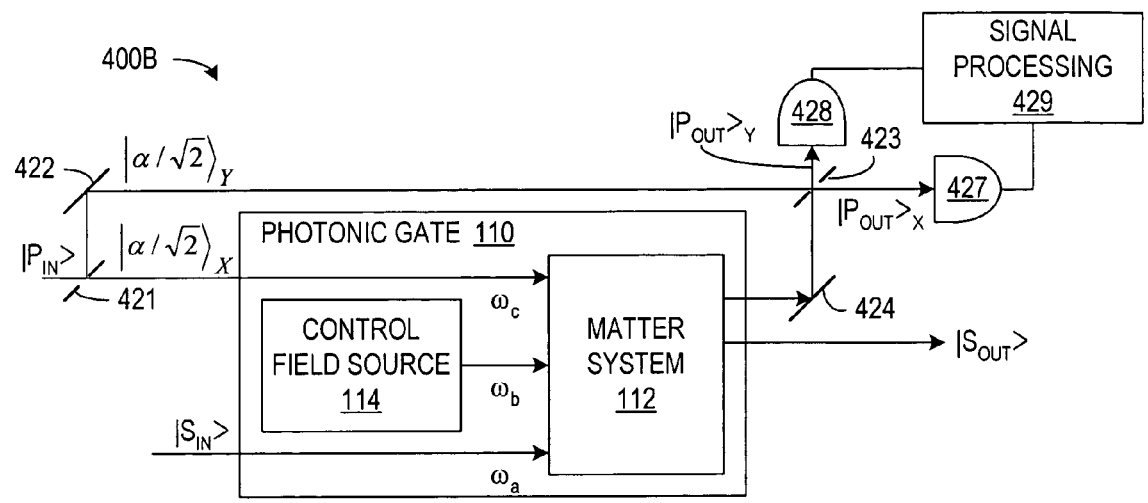

The measurement process illustrated above uses a homodyne measurement, which is highly efficient but generally requires the use of a strong local oscillator. FIG. 4B illustrates a measurement system 400B that uses a Mach-Zehnder interferometer including 50/50 beam splitters 421 and 423, reflectors 422 and 424, and photodiodes 427 and 428 to measure the phase shift in a coherent probe photon state $|\alpha\rangle$. In system 400B, 50/50 beam-splitter 421 splits the coherent state $|\alpha\rangle$ into a two-mode separable state $|\alpha/\sqrt{2}\rangle_X|\alpha/\sqrt{2}\rangle_Y$, where subscripts X and Y designate spatially separated paths. One mode $|\alpha/\sqrt{2}\rangle_X$ is input into photonic gate 110, where that mode $|\alpha/\sqrt{2}\rangle_X$ acquires a phase shift $e^{in\chi t}$ that depends on the number n of photons of angular frequency $\omega_a$ in signal state $|S_{IN}\rangle$. The phase shifted state $|\alpha e^{in\chi t}/\sqrt{2}\rangle_X$ from photonic gate 110 reflects from mirror 424 onto 50/50 beam splitter 423, which combines phase-shifted state $|\alpha e^{in\chi t}/\sqrt{2}\rangle_X$ with the second mode $|\alpha/\sqrt{2}\rangle_Y$ from beam splitter 421 via mirror 422. The output probe state after beam-splitter 423 is a two-mode state as indicated in Equation 7, where subscripts X and Y designate spatially separated paths to respective detectors 427 and 428.

$$|P_{OUT}\rangle_X|P_{OUT}\rangle_Y = |(1+e^{in\chi t})\alpha/2\rangle_X|(1-e^{in\chi t})\alpha/2\rangle_Y \quad \text{Equation 7:}$$

In the regime where $\chi t$ is small, the output probe state can be expressed as $|\alpha(1+in\chi t/2)\rangle_X|in\alpha\chi t/2\rangle_Y$, and a direct measurement of second mode $|in\alpha\chi t/2\rangle_Y$ using photodiode 428 gives a measurement current proportional to photon intensity $(n\alpha\chi t)^2$. Photodiode 428 can be a conventional device that is unable to distinguish a single photon from zero or two photons, but photodiode 428 can distinguish between zero and a large number of photons. Assuming that the product $\alpha\chi t$ is relatively large, photodiode 428 can efficiently distinguish whether output mode $|P_{OUT}\rangle_Y$ has 0 or approximately $(\alpha\chi t)^2$ photons. System 400B thus has enormous advantages over currently used detectors because the efficiency of system 400B detecting single photons is close to unity.

If signal state $|S_{IN}\rangle$ is a superposition of Fock states and of the form $c_0|0\rangle_a+c_1|1\rangle_a$, the state $|\Psi'\rangle$ of the total system after the beam splitter and EIT interaction is found to have the approximate form given in Equation 8. If photodiode 428 measures a nonzero current, then Equation 8 indicates that signal state $|S_{OUT}\rangle$ includes a photon of angular frequency $\omega_a$.

$$|\Psi'\rangle = c_0|0\rangle_a|\alpha\rangle_{b,X}|0\rangle_{b,Y}+c_1|1\rangle_a|(1+e^{i\chi t})\alpha/2\rangle_X|(1-e^{i\chi t})\alpha/2\rangle_Y \quad \text{Equation 8:}$$

If signal state $|S_{IN}\rangle$ is a superposition of Fock states and of the form $c_0|0\rangle_a+c_1|1\rangle_a+c_2|2\rangle_a$, both component Fock states $|1\rangle_a$ and $|2\rangle_a$ include photons of angular frequency $\omega_a$ and therefore cause phase shifts. However, the magnitude of the resulting current in photodiode 428 easily distinguishes the phase shift resulting from component state $|1>_a$ from the phase shift resulting from component state $|2>_a$. As noted above, when $\chi t$ is small, the current measured in photodiode 428 is approximately proportional to $(n\alpha\chi t)^2$. The current that photodiode 428 measures for component state $|2>_a$ is thus about four times the current measured for component state $|1>_a$.

In one operating mode of measurement system 400B, a laser can provide a continuous coherent state for probe state $|P_{IN}>$, while control field source 114 continuously pumps matter system 112. With the control field and probe state being continuous, measurement system 400B does not require synchronization of probe state $|P_{IN}>$ and signal state $|S_{IN}>$. A conventional signal processor 429 can analyze the current signals from one or both of photodiodes 427 and 428 to monitor the number of photons in signal state $|S_{IN}>$ or to determine when signal state $|S_{IN}>$ is a single-photon state.

In accordance with another aspect of the invention, measurement system 400B can be tuned to act as a parity detector for signal state $|S_{IN}>$. As noted above, photodiode 428 measures a probe state $|(1-e^{in\chi t})\alpha/2>_Y$. If photonic gate 110 is such that the quantity $\chi t$ is equal to $\pi$, then even photon numbers produce a phase shift that is a multiple of $2\pi$, which is effectively no phase shift. Only an odd photon number n of photons in signal state $|S_{IN}>$ causes a phase shift, which photodiode 428 detects as a non-zero current.

An advantage of measurement system 400B is that photodiode 428 measures light through a "dark port" that (if noise is neglected) has zero intensity unless a photon is in the signal state. The presence of a photon in the signal state thus provides a distinctive signal. However, an EIT system such as used in the exemplary embodiment of photonic gate 110 is always likely to have a limited amount of noise arising from decoherence and dephasing. Dephasing can cause a small phase shift in the probe state that would cause some light flow through the dark port of the Mach-Zehnder interferometer even when no signal photon (e.g., of angular frequency $\chi_a$) is present. However, photodiode 428 can measure the amount of light (not just the presence of light) at the dark port, and proper tuning of the phase shift induced in photonic gate 110 can make the noise insignificant compared to the amount of light from the dark port when a single signal photon is present. Photodiode 428 then distinguishes a few photons from many photons, which can be achieved using conventional photodiodes. If photonic gate 110 employs a photon loss mechanism to attenuate the probe photon state, the attenuation can similarly be maximized to distinguish the dark port signal from the noise.

The effects of noise and dissipation in detector 400B can be analyzed for the case where matter system 110 is an EIT system of FIG. 2A. If a probe state of angular frequency $\omega_c$ is used to detect photons of angular frequency $\omega_a$, one of the chief sources of error in the phase shift in the probe state is dephasing on a spontaneous 3–4 transition of matter system 110. The effect of this spontaneous emission on a coherent probe state $|\xi/\sqrt{2}>$ is the introduction of a random phase shift $\phi$ resulting in an output probe state $|\xi e^{i\phi}/\sqrt{2}>$. If signal state $|S_{IN}>$ is the superposition $c_0|0>+c_1|1>$, the current $I_c$ that detector 427 measures depends on the random phase shift $\phi$ as indicated in Equation 9.

Equation 9:

-continued
$$I_c = |c_0|^2 \frac{\xi}{2}(1-\cos\phi) + |c_1|^2 \frac{\xi}{2}(1-\cos[\phi+\chi'])$$

The distribution for phase shift $\phi$ depends on the exact dephasing mechanism of matter system 110. For illustrative purposes, a square profile ranging from $-\phi_0$ to $\phi_0$ is assumed here, but a similar answer is obtained for a Gaussian or Poisson distribution. Integrating $I_c$ over this phase distribution the current $I_c$ is of the form of Equation 10 in the limit where $\phi_0$ small. Thus the single photon can be distinguished from no photon as long as $(1-\cos[\chi t])$ is much greater than $\phi_0^2$. Basically this requires selection of the phase shift $\chi t$ to be larger than the possible random phase $\phi_0$.

Equation 10:

$$I_c \approx |c_0|^2 \frac{\xi^2 \phi_0^2}{12} + |c_1|^2 \frac{\xi}{2}(1-\cos[\chi'])$$

Figure 4C:
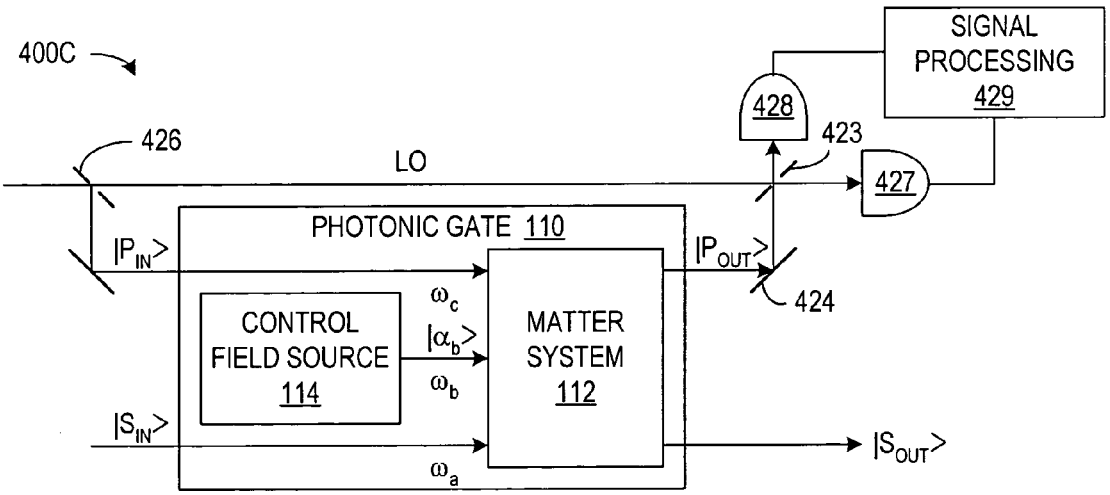

FIG. 4C illustrates a detector 400C in accordance with yet another embodiment of the invention. For detector 400C, a laser or other beam source produces a probe beam in a coherent state. A weak beam splitter 426 splits off a small fraction (e.g., 5 to 10%) of the coherent state to form input probe state $|P_{IN}>$ and leave a strong local oscillator signal LO. Input probe state $|P_{IN}>$ is preferably a coherent state $|\alpha_c>$ having a photon number expectation value $|\alpha_c|^2$ that is less than about 100 and more preferably in a range of 10 to 50, while signal state $|S_{IN}>$ is in a Fock state or superposition of Fock states having a photon number and an intensity corresponding to 0 or 1 photon.

Control field source 114 is preferably a laser producing light having an output angular frequency $\omega_b$. Accordingly, the control field is more accurately described as a coherent photon state $|\alpha_b>$, rather than as a classical electromagnetic field. The properties or behavior of the coherent state $|\alpha_b>$ can differ from that of a classical electromagnetic field, particularly when state $|\alpha_b>$ has a photon number expectation value $|\alpha_b|^2$ that is less than about 100 (e.g., in a range of 10 to 50).

The evolution of the coherent states $|\alpha_b>$ and $|\alpha_c>$ can be derived from the evolution of Fock states. In particular, Fock states components containing $n_a$, $n_b$, and $n_c$ photons respectively drive the three frequency channels of the resonant four-level manifold of the quantum system. If matter system 110 includes N four-level atoms that are fixed and stationary in a volume that is small compared to the optical wavelengths, and if the durations of the three pulse envelope functions of the Fock states are long compared to the lifetime of atomic level 2, the unperturbed number eigenstate $|1, n_a, n_b, n_c>$ evolves as indicated in Equation 11.

$$|1,n_a,n_b,n_c> \rightarrow e^{-iWt}|1,n_a,n_b,n_c> \quad \text{Equation 11:}$$

The quantity W in Equation 11 generally depends on the properties of the matter system and the angular frequencies $\omega_a$, $\omega_b$, and $\omega_c$. Equations 12A and 12B give the quantity W in the case where angular frequencies $\omega_a$ and $\omega_b$ are precisely tuned to the respective atomic transition angular frequencies $\omega_{12}$ and $\omega_{32}$, dephasing is negligible, and the spontaneous emission branching ratios from atomic levels 2 and 4 are approximately unity. In Equation 12A, N is the number of four-level atoms, $\Omega_a$, $\Omega_b$, and $\Omega_c$ are the effective vacuum Rabi frequencies as given in Equation 12B, $\nu_c$ is the detuning parameter ($\Omega_c-\omega_{43}$), and $\gamma_2$ and $\gamma_4$ are approximately equal to the spontaneous emission rates $A_{21}$ and $A_{43}$. In Equation 12B, k is an index having values a, b, and c; $\sigma_k$ by definition is the resonant atomic absorption cross-section $3\lambda_k^2/2\pi$ at wavelength $\lambda_k$ $2\pi c/\omega_c$; $\pi w^2$ is the effective laser mode cross-sectional area, $A_k$ is the spontaneous emission rate between two corresponding atomic levels; and $\omega_k$ is the bandwidth of the profile function describing the adiabatic interaction of a pulsed laser field with a stationary atom.

Equation 12A:
$$W = \frac{N|\Omega_a|^2|\Omega_c|^2 n_a n_c}{v_c|\Omega_b|^2 n_b + i(\gamma_4|\Omega_b|^2 n_b + \gamma_2|\Omega_c|^2 n_c)}$$

Equation 12B:
$$|\Omega_k|^2 = \frac{1}{8\pi}\frac{\sigma_k}{\pi w^2}A_k \Delta\omega_k$$

Equation 12A indicates that W for four-level EIT system is complex, indicating potential absorption of the photons of frequency $\omega_a$. However, in the parameter regime where the inequality of Equation 13 is satisfied, the probability that one of the atoms will scatter a single photon of angular frequency $\omega_a$ becomes small. (Equation 13 simplifies to the requirement that $v_c/\gamma_4$ be large when $|\Omega_b|^2|\alpha_b|^2/\gamma_2$ is about equal to $|\Omega_c|^2|\alpha_c|^2/\gamma_4$). Working in this regime, the state $|1, n_a, n_b, n_c\rangle$ acquires purely a phase-shift from the nonlinear mechanism. This phase shift can be the basis of a high-efficiency nondestructive detector.

Equation 13:
$$\frac{|\Omega_b|^2|\alpha_b|^2}{\gamma_2}\frac{v_c}{\gamma_4} \gg \frac{|\Omega_b|^2|\alpha_b|^2}{\gamma_2} + \frac{|\Omega_c|^2|\alpha_c|^2}{\gamma_4}$$

The evolution of the atom-field state including coherent states can be evaluated using sums over Fock states representing each coherent state. In particular, Equation 14 shows the evolution after a time t of an N-atom quantum state during an interaction with an $n_a$-photon Fock state in the a channel, and weak coherent states parameterized by $\alpha_b$ and $\alpha_c$ in the b and c channels, respectively. Equation 15 defines the phase shift $\phi$. Equations 14 and 15 show that evolved state $|\psi'(n_a)\rangle$ is not a simple tensor product of a Fock state with two coherent states unless the magnitude of parameter $\alpha_b$ of the original b channel coherent state is large, in which case, evolved state $|\psi'(n_a)\rangle$ is about equal to $|1,n_a,\alpha_b,\alpha_c e^{-in_a\phi}\rangle$. Therefore, only when the coupling field driving channel b is a classical field does the EIT matter system provide an exact cross-Kerr nonlinearity; and for a weak coherent state input pulse, the control field does not act as a classical field.

Equation 14:
$$|\psi(n_a)\rangle \equiv |1, n_a, \alpha_b, \alpha_c\rangle$$
$$= e^{-\frac{1}{2}(|\alpha_b|^2+|\alpha_c|^2)} \sum_{n_b=0}^{\infty}\sum_{n_c=0}^{\infty} \frac{\alpha_b^{n_b}\alpha_c^{n_c}}{\sqrt{n_b!n_c!}}|1, n_a, n_b, n_c\rangle$$

-continued
$$\rightarrow |\psi'(n_a)\rangle = e^{-\frac{1}{2}|\alpha_b|^2}\sum_{n_b=0}^{\infty}\frac{\alpha_b^{n_b}}{\sqrt{n_b!}}|1, n_a, n_b, \alpha_c e^{-i2(n_a\phi|\alpha_b|^2/n_b)}\rangle$$

Equation 15:
$$\phi \equiv \chi^t \equiv \frac{N|\Omega_a|^2|\Omega_c|^2}{v|\Omega_b|^2|\alpha_b|^2}t$$

Even though the evolved state $|\psi'(n_a)\rangle$ may not be a coherent state, detector 400C can still efficiently determine the number $n_a$ of photons in the signal state through the measurement of quadratures $\langle X\rangle$ and/or $\langle Y\rangle$. Equation 16 defines the quadrature homodyne operator $\hat{x}(\theta)$ in terms of creation operator $\hat{c}^\dagger$ and annihilation operator $\hat{c}$ for photons of angular momentum $\omega_c$. The quadrature homodyne operator $\hat{x}(\theta)$ is equal to the position operator X for $\theta$ equal to zero and equal to momentum operator Y for $\theta$ equal to $\pi/2$. The expectation value of the quadrature homodyne operator $\hat{x}(\theta)$ can be evaluated for the evolved state of Equation 14 yielding Equations 17. Similarly, the mean square of the quadrature homodyne operator $\hat{x}(\theta)$ can be evaluated yielding Equation 18.

Equation 16:
$$\hat{x}(\theta) \equiv \frac{1}{\sqrt{2}}(\hat{c}^\dagger e^{i\theta} + \hat{c}^x e^{-i\theta})$$

Equation 17:
$$\langle \hat{x}(\theta)\rangle \equiv \langle\psi'(n_a)|\hat{x}(\theta)|\psi'(n_a)\rangle$$
$$= \sqrt{2}e^{-|\alpha_b|^2}\sum_{n_b=0}^{\infty}\frac{|\alpha_b|^2}{n_b}\text{Re}[\alpha_c e^{-i(n_a\phi|\alpha_b|^2/n_b+\theta)}]$$

Equation 18:
$$\langle \hat{x}^2(\theta)\rangle \equiv \langle\psi'(n_a)|\hat{x}^2(\theta)|\psi'(n_a)\rangle$$
$$= \frac{1}{2} + |\alpha_c|^2 + e^{-|\alpha_b|^2}\sum_{n_b=0}^{\infty}\frac{|\alpha_b|^2}{n_b}\text{Re}[\alpha_c^2 e^{-i2(n_a\phi|\alpha_b|^2/n_b+\theta)}]$$

Based on the calculated expectation values, Equation 19 gives the signal-to-noise ratio for a photon detector measurement based on the momentum quadrature in detector 400C. In Equation 19, functional dependence (1) and (0) indicate the number $n_a$ of photons of angular frequency $\omega_a$ in the state for which the expectation value is evaluated. Since the photon states are nearly coherent, the probability of a false positive count for a state where the number $n_a$ of angular frequency $\omega_a$ is equal to 1 is given in Equation 20.

Equation 19:
$$SNR = \frac{\langle Y(1)\rangle - \langle Y(0)\rangle}{\sqrt{\langle Y^2(1)\rangle - \langle Y(1)\rangle^2}}$$

Equation 20:
$$P_{error} = e^{-2(\alpha_c \sin\theta/2)^2}$$

Figure 5A:
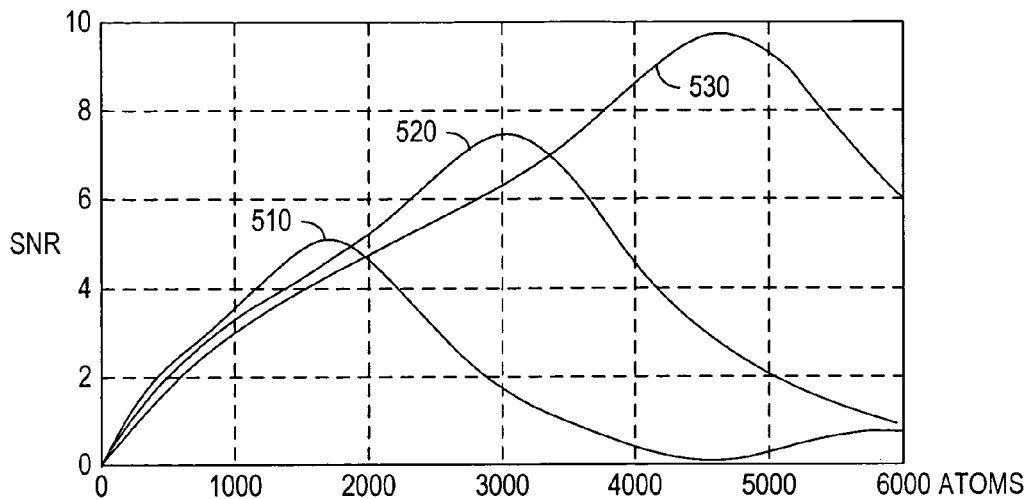
FIGS. 5A and 5B show plots of the signal-to-noise ratio for a detector using low-intensity coherent states for the applied probe state and control state.

FIG. 5A shows the signal-to-noise ratio given by Equation 19 as a function of the number of atoms localized in the interaction region for $v_c/\gamma_2=30$ and three different strengths $\alpha_c$ of probe state $|P_{IN}\rangle$. Plots 510, 520, and 530 of FIG. 5A respectively correspond to parameter $\alpha_c$ equal to 4, 5, and 6 when the control field 116 and the probe state have the same strength (e.g., $|\alpha_b|=\alpha_c$).

If the wave function of Equation 14 described a coherent state, each curve in FIG. 5A would be given by $2|\alpha_b|\sin(\phi)$ and would exhibit a peak when the number N of atoms is about $15\pi^2|\alpha_b|^2$. Instead, the peaks of plots 510, 520, and 530 correspond to phase shifts smaller than $\pi/2$ because of the dependence of the summand in Equation 14 on number $n_b$. In practice, the value $|\alpha_b|^2$ should be greater than about $8\pi$ or about 25 to create a sufficiently large transparency window in the a channel for the parameters chosen here. Thus, the number of atoms needed to provide a sufficiently low probability of a false positive detection can be determined from FIG. 5A and Equation (14). In particular, with approximately 570 four-level atoms in the matter system, a phase shift of 0.24 radians corresponding to a SNR value of 2.19 is achievable. This leads to a false positive detection error probability of approximately 1 percent with a 0.8% probability of the absorption of the photon in the 1–2 transition. This specific example is not unique. A wide range of reasonable parameters leads to these error rates. Suppose for instance that one wishes to decrease the false positive detection error and absorption rates by an order of magnitude. In this case, a detuning $v_c$ of 160 (in units of the line width $\gamma_4$), 6900 atoms, and amplitudes $\alpha_b$ and $\alpha_c$ about equal to 10 achieves a phase shift of 0.137, which leads to a SNR=2.66 (or false detection probability of 0.08%) with an absorption rate of 0.08 percent. Generally to increase the SNR ratios requires one to increase the number of atoms.

Figure 5B:
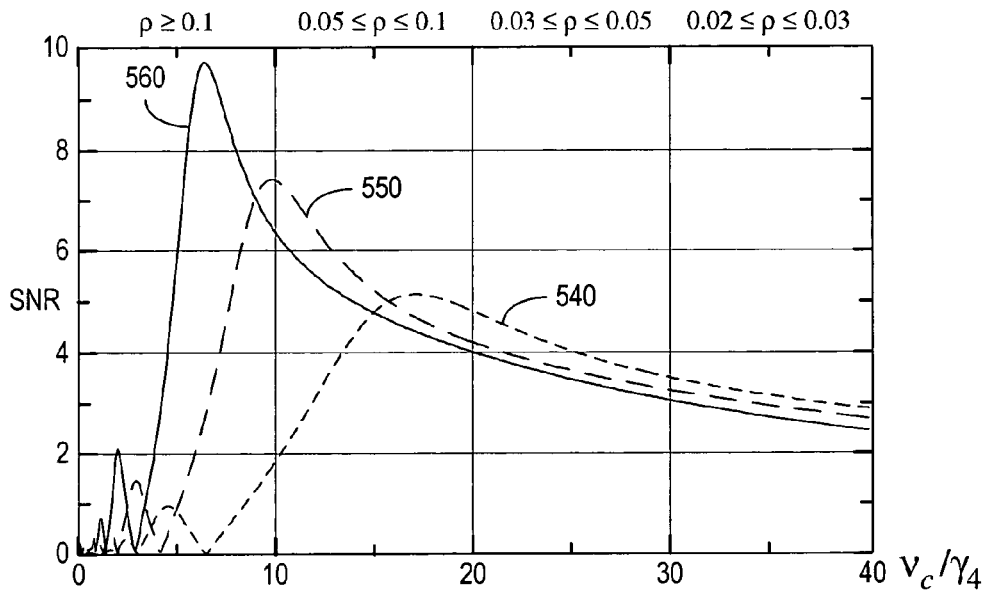

FIG. 5A also indicates that for a given value of $v_c/\gamma_4$ and $\alpha_c$ the effect of increasing the number N of atoms eventually leads to a decrease in the signal-to-noise ratio. This results from creating a phase shift that is too large. If a larger number N of atoms are going to be used, one way to avoid the decrease in signal-to-noise ratio is to decrease the ratio $v_c/\gamma_4$. FIG. 5B shows the signal-to-noise ratio given by Equation 19 as a function of ratio $v_c/\gamma_4$ for 1000 atoms localized in the interaction region. Plots 540, 550, and 560 of FIG. 5B respectively correspond to parameter $\alpha_c$ equal to 4, 5, and 6 when the control field 116 and the probe state have the same strength (e.g., $|\alpha_b|=\alpha_c$).

During a preferred operating mode of detector 400C, signal state $|S_{IN}\rangle$ corresponds to a wave packet containing zero or one photon of angular frequency $\omega_a$ and having a pulse width long enough to fit through the transparency window of EIT system. During the pulse width of the signal, control field source generates a continuous beam having a coherent state and a power or energy about 10 to 100 times that of the signal state $|S_{IN}\rangle$. Control field source 114 may include a laser with an attenuator or a beam splitter in the beam path so that the resulting control field 116 has the desired energy. Preferably, the probe state $|P_{IN}\rangle$ corresponds to a continuous beam similarly having an energy or power during the signal pulse width that is about the same as that of the control field. Beam splitter 426 that splits the beam corresponding to probe state $|P_{IN}\rangle$ from the beam corresponding to the local oscillator LO may direct less than 10% of the beam power from a laser into probe state $|P_{IN}\rangle$. With control and probe beams being continuous, the presence of a photon passing through detector 400C will result in a fluctuation in the measurement of photodiodes 427 and 428 that signal processor 429 can analyze to detect the presence of a signal photon.

Figure 4D:
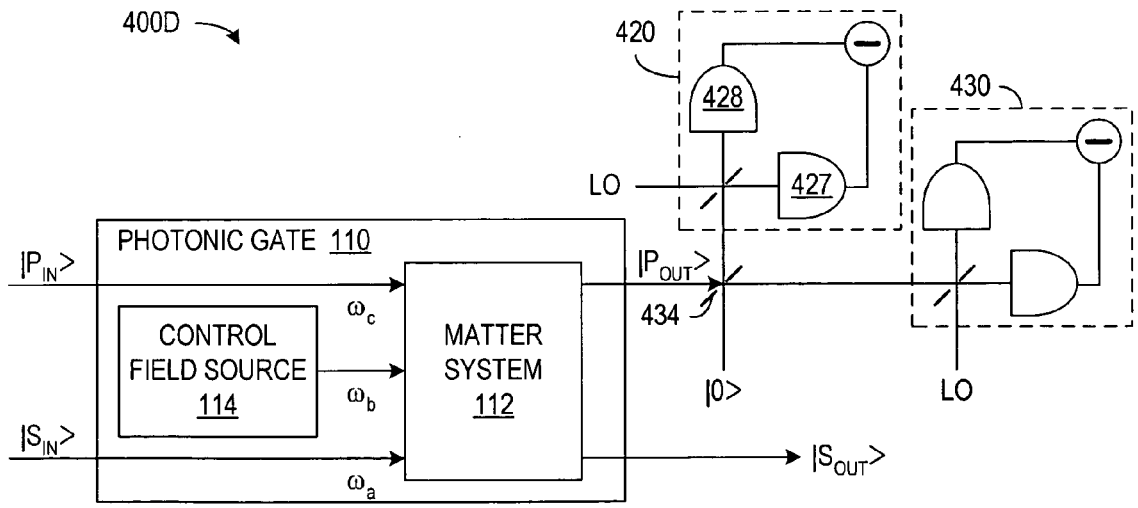

FIG. 4D shows a measurement system 400D in accordance with an embodiment of the invention using a dual homodyne (or heterodyne) measurement. In particular, measurement system 400D includes a beam splitter 434 that directs a portion of the output probe state $|P_{OUT}\rangle$ to a first homodyne detector 420 and another portion of the output probe state $|P_{OUT}\rangle$ to a second homodyne detector 430. A vacuum state $|0\rangle$ (i.e., no input) is at the other input to beam splitter 434. As a result of the phase difference that beam splitter 434 introduces between the transmitted and reflected portions of output probe state $|P_{OUT}\rangle$, homodyne detector 420 provides a measurement of the expectation value $\langle\hat{x}(\theta)\rangle$ of the homodyne operator $\hat{x}(\theta)$ for angle $\theta$, and homodyne detector 430 provides a measurement of the expectation value $\langle\hat{x}(\theta+\pi/2)\rangle$ of the homodyne operator $\hat{x}(\theta+\pi/2)$ for angle $\theta+\pi/2$. Accordingly, measurement system 400D can obtain simultaneous information about the momentum and position quadratures for the output probe state $|P_{OUT}\rangle$.

Measurement systems 400A, 400B, 400C, and 400D as described above, are able to infer the presence or absence of a photon in a signal state by measuring a probe state without directly measuring and destroying the signal photon. The output signal state $|S_{OUT}\rangle$ thus has a definite photon number for photons of angular frequency $\omega_a$ and can be used in a quantum information processing system after the measurement.

The detectors described above provide an output state $|S_{OUT}\rangle$ having a definite photon number, but other characteristics such as the polarization, orbital angular momentum, time binning, or momentum of the photon may be unmeasured and unknown. In general, unmeasured characteristics of output state $|S_{OUT}\rangle$ will be the same as those of input state $|S_{IN}\rangle$ provided that interaction between the input state $|S_{IN}\rangle$ and the probe state $|P_{IN}\rangle$ preserves the desired characteristic. However, interactions of probe state $|P_{IN}\rangle$ and signal state $|S_{IN}\rangle$ can correspond to absorption of the photon of signal state $|S_{IN}\rangle$ and subsequent emission of photon state $|S_{OUT}\rangle$. Such absorption and emission processes may not conserve specific photon characteristics such as polarization or orbital angular momentum. Further, interactions such as found in EIT systems can be asymmetric (e.g., have a preferred axis), and such asymmetry can cause input states with different characteristics to evolve differently, resulting in a change in characteristics such as the polarization or the angular momentum of a photon being measured.

Figure 6A:
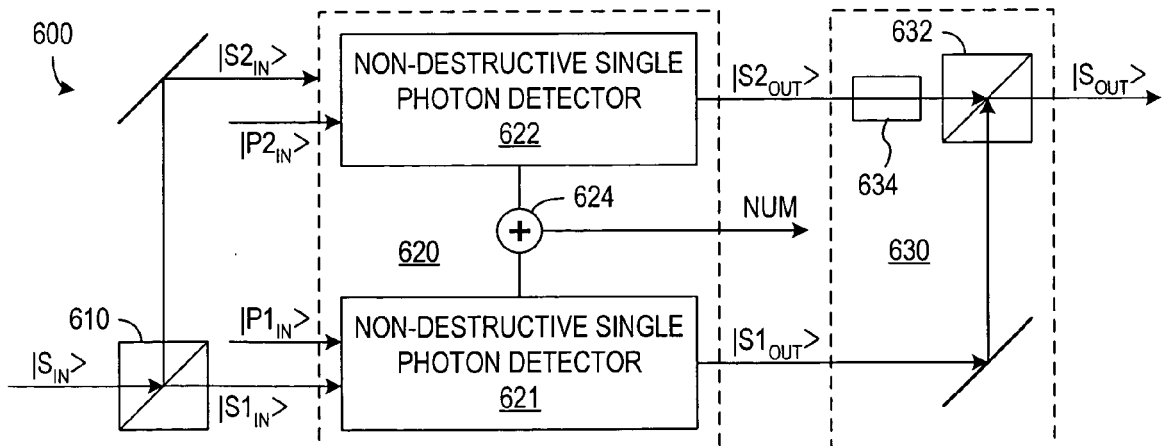
FIGS. 6A, 6B, 6C, and 6D illustrate non-destructive photon detectors in accordance with alternative embodiments of the invention that preserve a characteristic such as the polarization of an input photon signal state.

FIG. 6A illustrates a detector 600 capable of measuring an input signal $|S_{IN}\rangle$ and producing an output signal state $|S_{OUT}\rangle$ containing a known number of photons while preserving one or more characteristics of the input signal state $|S_{IN}\rangle$. In general, different embodiments of detector 600 can be constructed to preserve a different photon characteristic such as the polarization, the orbital angular momentum, the time bin, or momentum. For the general case, detector 600 includes a beam splitting system 610, a non-destructive measurement system 620, and a beam combining system 630. The specific implementation of beam splitting system 610, measurement system 620, and beam combining system 630 will depend on the preserved characteristic.

Beam splitting system 610 splits the input signal state $|S_{IN}\rangle$ into separate modes having definite values for the characteristic being preserved. For polarization preservation, for example, beam splitting system 610 is a polarizing beam splitter that splits input signal state $|S_{IN}\rangle$ into two modes $|S1_{IN}\rangle$ and $|S2_{IN}\rangle$ having definite polarization (e.g., respectively having horizontal polarization and vertical polarization.) Alternatively, for angular momentum preservation, beam splitting system 610 may include a holographic film that separates photon states having different orbital angular momentum. For preservation of time binning, beam splitting system 610 may spatially separate photons received during different time bins for separate measurements. Similarly, photons in a localized wave packet can be separated according to momentum for separate measurement.

Measurement system 620 includes a set of non-destructive photon detectors 621 and 622 and a quantum coherent signal adder 624. FIG. 6A shows an exemplary embodiment of the invention where measurement system 620 includes two non-destructive detectors 621 and 622, which are suitable for preservation of a characteristic such as polarization that has two independent basis states. More generally, the number of non-destructive detectors in system 620 depends on the number of independent basis states used for the characteristic being preserved. For preservation of orbital angular momentum, time bin, or momentum, the number of non-destructive detectors depends on the number of available states of the preserved characteristic that may be used in the input state. The following description concentrates on the specific example of polarization preservation, but generalization to systems that preserve other characteristics such as the spin state, orbital angular momentum, time bin, or momentum of a photon state will be apparent to those of skill in the art.

In FIG. 6A, each detector 621 or 622 is capable of measuring an input mode $|S1_{IN}\rangle$ or $|S2_{IN}\rangle$ to determine the number of photons in an output mode $|S1_{OUT}\rangle$ or $|S2_{OUT}\rangle$, and each detector 621 or 622 can be substantially identical to any of the non-demolition detectors described above that provides a quantum coherent electronic output signal indicating a measured number of photons. The output signal from each detector 621 or 622 may be as described above with reference to FIGS. 4A to 4D, for example, a difference signal Id resulting from a homodyne phase measurement or an output signal of a photodiode measuring intensity of probe photons output from a dark port in a heterodyne measurement system. Detector 621 is set up for measurement of mode $|S1_{IN}\rangle$, but a quantum coherent electronic signal from detector 621 is input to a quantum coherent adder 624 without being observed. Similarly, detector 622 is set up for measurement of the second mode $|S2_{IN}\rangle$, and a quantum coherent electronic signal from detector 622 is input to a quantum coherent adder 624 without being observed.

Quantum coherent adder 624 combines the electronic signals from detectors 621 and 622 to generate an output signal NUM indicating the total number of photons in the two modes $|S1_{OUT}\rangle$ and $|S2_{OUT}\rangle$. To avoid collapsing the photon state into one of the modes, portions of detectors 621 and 622 and adder 624 can be kept sufficiently cold (e.g., at or below a few mK°) so that photodiodes in detectors 621 and 622 produce quantum coherent electron states, and the electron states remain coherent through current addition process. The addition process may, for example, be implemented using a wired OR or a pair of diodes with output terminals connected to a wired OR. Output signal NUM can thus indicate when there is a photon in one of the two modes $|S1_{OUT}\rangle$ and $|S2_{OUT}\rangle$ without indicating which mode $|S1_{OUT}\rangle$ or $|S2_{OUT}\rangle$ contains the photon. Signal NUM therefore provides a measurement of the photon number without changing the polarization state.

The effects of detectors 621 and 622 on photon polarization can be controlled using knowledge of the characteristics (e.g., the polarizations) of photons in modes $|S1_{IN}\rangle$ and $|S2_{IN}\rangle$. In particular, preferred axes of detectors 621 and 622 (if any) can be oriented (e.g., aligned with the respective polarization directions of modes $|S1_{IN}\rangle$ and $|S2_{IN}\rangle$) so that detectors 621 and 622 have the same effects (e.g., the same phase shift and/or polarization rotation) on respective modes $|S1_{IN}\rangle$ and $|S2_{IN}\rangle$. Additionally or alternatively, corrective optical elements (not shown) in detectors 621 and 622 can manipulate the polarizations or the phases of the separated photon states so that output modes $|S1_{OUT}\rangle$ and $|S2_{OUT}\rangle$ have the same relative polarization and phase as input modes $|S1_{IN}\rangle$ and $|S2_{IN}\rangle$.

Beam combining system 630, which can be a polarizing beam splitter 632 in a polarization preserving detector, constructs an output state $|S_{OUT}\rangle$ from output modes $|S1_{OUT}\rangle$ and $|S2_{OUT}\rangle$. Optionally, system 630 can include one or more corrective optical elements 634 to make output modes $|S1_{OUT}\rangle$ and $|S2_{OUT}\rangle$ have the same relative properties as input modes $|S1_{IN}\rangle$ and $|S2_{IN}\rangle$ if detectors 621 and 622 have different or unpredictable effects on respective modes $|S1_{IN}\rangle$ and $|S2_{IN}\rangle$. In the exemplary embodiment of the invention, output state $|S_{OUT}\rangle$ has the same polarization state as state $|S_{IN}\rangle$ because component modes $|S1_{OUT}\rangle$ and $|S2_{OUT}\rangle$ have the same relative polarization and phase as component modes $|S1_{IN}\rangle$ and $|S2_{IN}\rangle$ of state $|S_{IN}\rangle$. A single-photon (or an N-photon) state $|S_{OUT}\rangle$ having a desired polarization can thus be constructed from an input state $|S_{IN}\rangle$ that may not have a definite number of photons but does have the desired polarization.

More generally, when preserving a characteristic such as angular momentum, the total photon number for three or more modes can be measured without collapsing to a definite state corresponding to one of the modes, and the three or more modes can be recombined to produce a state with a definite photon number and the original characteristic state. In cases where the preserved characteristic of the input state $|S_{IN}\rangle$ (e.g., the polarization or angular momentum state) represents quantum information (e.g., a qubit or a qudit), the number of photons in the input state can be measured without destroying the quantum information that the preserved characteristic may represent. In particular, a photon state that represents the desired quantum information and has a measured number of photons can be constructed.

Figure 6B:
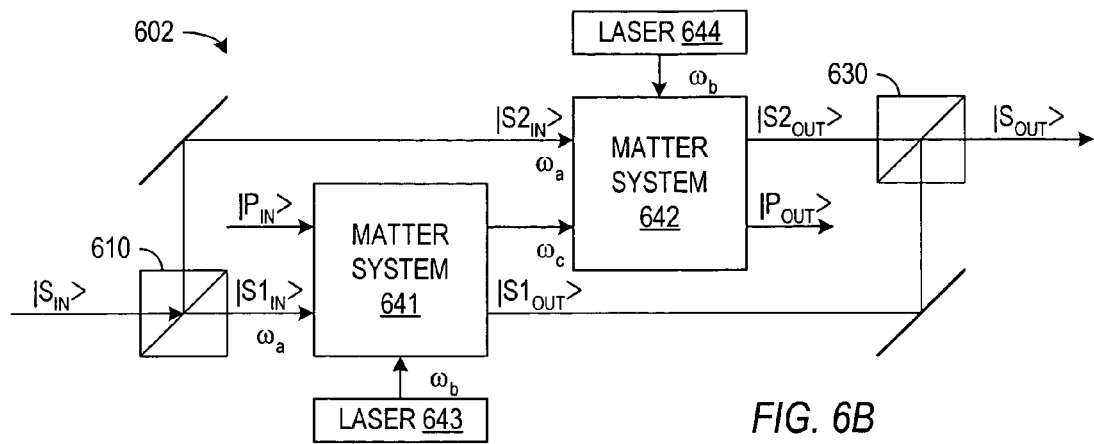

FIG. 6B illustrates a polarization-preserving detector 602 in accordance with another embodiment of the invention. Detector 602 includes a beam splitter 610, a pair of EIT matter systems 641 and 642, and a beam combiner 632. Beam splitter 610 is a polarizing beam splitter that splits the input signal state $|S_{IN}\rangle$ according to polarization into modes $|S1_{IN}\rangle$ and $|S2_{IN}\rangle$ that are respectively directed in parallel into respective matter systems 641 and 642. Matter systems 641 and 642 are also arranged to be serially in the path of a photonic probe state $|P_{IN}\rangle$, which can be a Fock state, a coherent state, or a squeezed state having a photon number expectation value that is easily detectable (e.g., 10 to 100 or more photons).

In an exemplary embodiment of the invention, each matter system 641 or 642 contains one or more 4-level atoms or molecules having energy levels as illustrated in FIG. 2A. Input state $|S_{IN}\rangle$ is a state of photons having angular frequency $\omega_a$, and probe state $|P_{IN}\rangle$ is a state of photons having frequency $\omega_c$. Lasers 643 and 644 illuminate respective matter systems 641 and 642 with photons of frequency $\omega_b$. As a result, matter system 641 changes the phase of probe state $|P_{IN}\rangle$ by an amount that depends on the number of photons in an output mode $|S1_{OUT}\rangle$ from matter system 641, and matter system 642 changes the phase of probe state $|P_{IN}\rangle$ by an amount that depends on the number of photons in output mode $|S2_{OUT}\rangle$ from matter system 642. Beam combiner 632 combines modes $|S1_{OUT}\rangle$ and $|S2_{OUT}\rangle$ from matter systems 641 and 642 into output signal state $|S_{OUT}\rangle$.

The phase of output probe state $|P_{OUT}\rangle$, which depends on phase changes in both matter systems 641 and 642, can be measured using homodyne or heterodyne techniques such as described above. The resulting measurement indicates the number of photons in output signal state $|S_{OUT}\rangle$. Since the measurement carries no information about the individual phase changes in matter systems 641 or 642, output signal state $|S_{OUT}\rangle$ is the sum of states $|S1_{OUT}\rangle$ and $|S2_{OUT}\rangle$. The orientations of matter systems 641 and 642 relative to the polarizations of modes $|S1_{IN}\rangle$ and $|S2_{IN}\rangle$ and/or corrective optical elements (not shown) in matter systems 641 and 642 can be used to ensure that the relative phase and polarization of modes $|S1_{OUT}\rangle$ and "$S2_{OUT}\rangle$ are the same as the relative phase and polarization of modes $|S1_{OUT}\rangle$ and $|S2_{OUT}\rangle$. As a result, output signal state $|S_{OUT}\rangle$ has the same polarization as input signal state $|S_{IN}\rangle$.

Figure 6C:
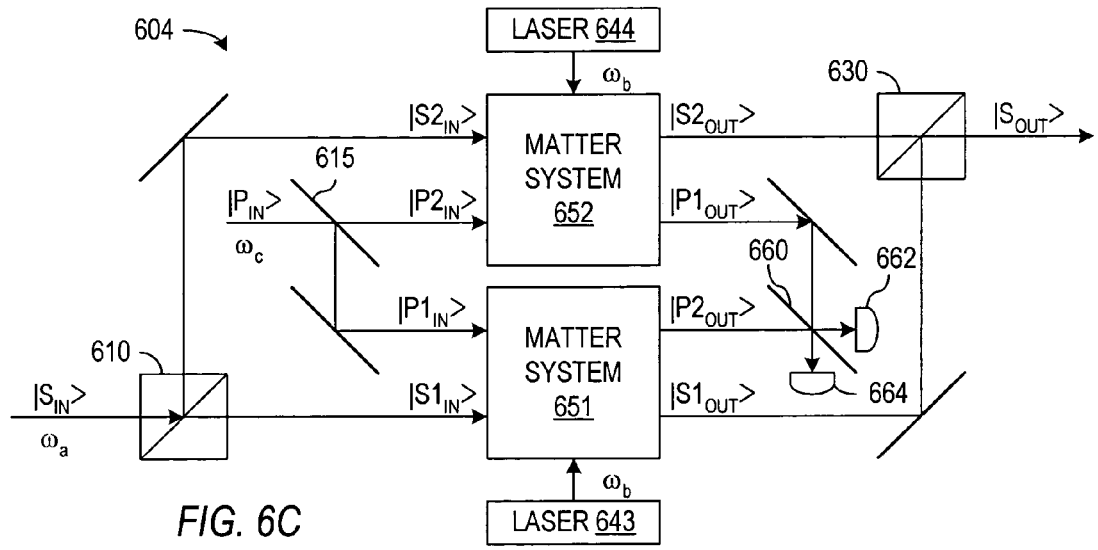

FIG. 6C illustrates a polarization-preserving detector 604 in accordance with yet another embodiment of the invention. Detector 604 includes beam splitters 610 and 615, a pair of EIT matter systems 651 and 652, and a beam combiner 632. In an exemplary embodiment, beam splitter 610 is a polarizing beam splitter that splits the input signal state $|S_{IN}\rangle$ according to polarization into modes $|S1_{IN}\rangle$ and $|S2_{IN}\rangle$ that are respectively directed in parallel into respective matter systems 651 and 652. Beam splitter 615 is preferably a non-polarizing 50-50 beam splitter that splits a state $|P_{IN}\rangle$ into spatially separated probe states $|P1_{IN}\rangle$ and $|P2_{IN}\rangle$ that are respectively applied to matter systems 651 and 652. Probe state $|P_{IN}\rangle$ (and separate probe states $|P1_{IN}\rangle$ and $|P2_{IN}\rangle$) can be a Fock, coherent, or squeezed state having a photon number expectation value that is easily detectable (e.g., 10 to 100 or more photons). Input probe states $|P1_{IN}\rangle$ and $|P2_{IN}\rangle$ being split from the same state $|P_{IN}\rangle$ have a definite phase relation (e.g., have the same phase).

Output probe states $|P1_{OUT}\rangle$ and $|P2_{OUT}\rangle$ from matter systems 651 and 652 have phases that change according to the number of photons in respective modes $|S1_{IN}\rangle$ and $|S2_{IN}\rangle$. The relative phases of output probe states $|P1_{OUT}\rangle$ and $|P2_{OUT}\rangle$ can be compared to determine the total number of photons in output signal modes $|S1_{IN}\rangle$ and $|S2_{IN}\rangle$ and accordingly the number of photons in the output state $|S_{OUT}\rangle$ from beam combiner 632. In an exemplary embodiment, matter systems 651 and 652 are such that the change in the phase of $|P1_{IN}\rangle$ when N photons are in mode $|S1_{OUT}\rangle$ is in the additive inverse of the change in the phase of $|P2_{IN}\rangle$ when N photons are in mode $|S2_{OUT}\rangle$. For a relative phase difference measurement, detector 604 includes a non-polarizing, 50-50 beam splitter 660 that combines probe beams from matter systems 651 and 652 to create a sum and a difference of probe states $|P1_{OUT}\rangle$ and $|P2_{OUT}\rangle$, and photodiodes 662 and 664 measure the intensity of the sum and the difference. As described above, the photodiode 662 measuring the light intensity from a dark port can indicate the presence of a photon in output signal state $|S_{OUT}\rangle$.

Figure 6D:
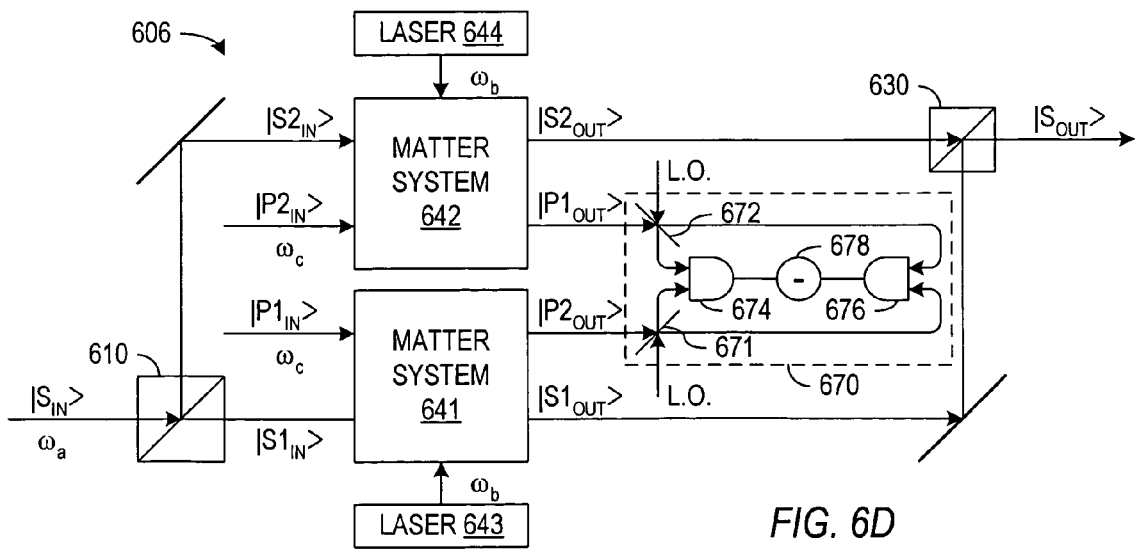

FIG. 6D illustrates a polarization-preserving photon detector 606 in accordance with an embodiment of the invention using a homodyne phase measurement of probe states $|P1_{OUT}\rangle$ and $|P2_{OUT}\rangle$ to determine the total number of photons in output signal state $|S_{OUT}\rangle$. Detector 606 includes a beam splitter 610, a pair of EIT matter systems 641 and 642, a beam combiner 632, and a homodyne measurement system 670. As described above, beam splitter 610 splits the input signal state $|S_{IN}\rangle$ having angular frequency $\omega_a$ into modes $|S1_{IN}\rangle$ and $|S2_{IN}\rangle$ that are directed into respective matter systems 641 and 642. At the same time, lasers 643 and 644 direct control fields having frequency $\omega_a$, and one or more laser or other light source directs probe states $|P1_{IN}\rangle$ and $|P2_{IN}\rangle$ having angular frequency $\omega_c$ into respective matter systems 641 and 642. Matter systems 641 and 642 are preferably such that the presence of a single photon in mode $|S1_{OUT}\rangle$ creates a change in the phase of probe state $|P1_{IN}\rangle$ that is equal to the change in the phase of probe state $|P2_{IN}\rangle$ that results when a single photon is present in mode $|S2_{OUT}\rangle$.

Homodyne measurement system 670 includes beam splitters 671 and 672 that respectively split probe states $|P1_{OUT}\rangle$ and $|P2_{OUT}\rangle$ into components that interfere with components from a local oscillator LO. Photodiode 674 measures the intensity of the combined portions of the probe states $|P1_{OUT}\rangle$ and $|P2_{OUT}\rangle$ reflected from beam splitters 671 and 672 and components of the local oscillator transmitted through beam splitters 671 and 672. Photodiode 676 measures the intensity of the combined portions of the probe states $|P1_{OUT}\rangle$ and $|P2_{OUT}\rangle$ transmitted through beam splitters 671 and 672 and components of the local oscillator reflected from beam splitters 671 and 672. Photodiodes 674 and 676 and the alignment of the components from beam splitters 671 and 672 are preferably such that output currents from photodiodes 674 and 676 provide no indication of whether the photons detected are from probe state $|P1_{OUT}\rangle$ or $|P2_{OUT}\rangle$. A signal from a differential amplifier 678 connected to photodiodes 674 and 676 can be used to determine whether at least one of the probe states $|P1_{OUT}\rangle$ and $|P2_{OUT}\rangle$ underwent a change in phase indicating the presence of a photon in one of modes $|S1_{OUT}\rangle$ and $|S2_{OUT}\rangle$, without determining whether the photon was in mode $|S1_{OUT}\rangle$ or $|S2_{OUT}\rangle$. Accordingly, a beam combining system including beam combiner 632 can construct an output state $|S_{OUT}\rangle$ having the same polarization as the input signal state $|S_{IN}\rangle$.

In accordance with another aspect of the invention, a non-destructive photon detector in accordance with an embodiment of the invention can convert a conventional, non-deterministic photon source that may sporadically or undependably emit a single photon into a deterministic photon source that releases a single photon on demand. The deterministic single photon source includes the conventional photon source, the non-destructive photon detector, and a photon storage system. When the photon detector includes an EIT system, the EIT system can introduce a phase shift in a probe state for signal measurement and store the signal photon for later release. In operation, the non-destructive photon detector measures the photon number for a state output from the conventional photon source. If the measured output state is not a single photon, another output photon state from the conventional photon source is measured. If the measured photon state contains a single photon, the measured photon state is stored in the photon storage system, from which the single photon state can be released on demand. If the non-destructive detector preserves a characteristic such as the polarization or angular momentum of the photon from the conventional photon source, the stored photon state will have the same characteristic as the input photons.

Figure 7A:
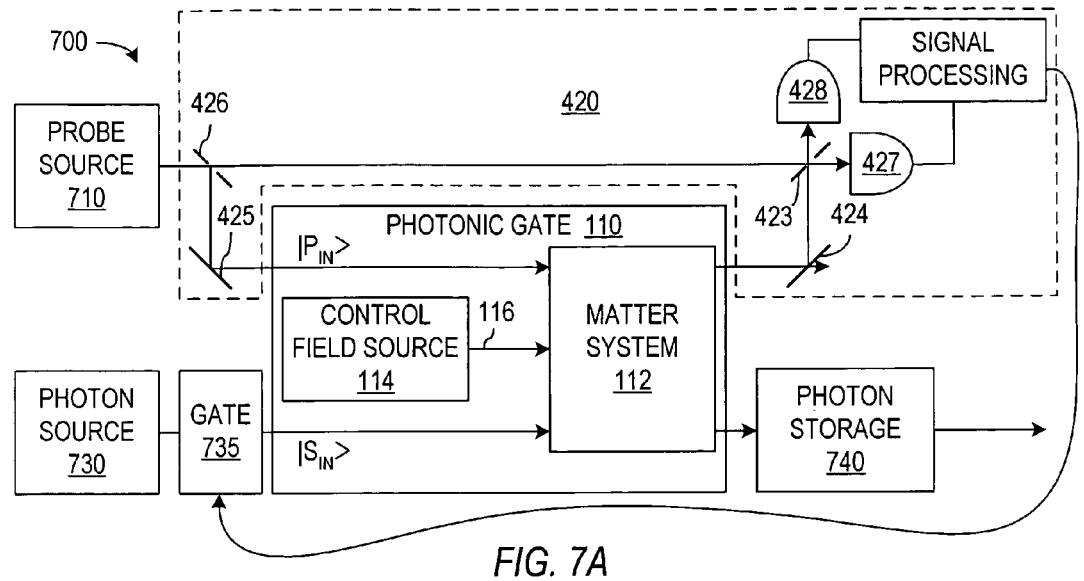
FIG. 7A is a block diagram of a single photon source in accordance with an embodiment of the invention.

FIG. 7A illustrates a deterministic single photon source 700 in accordance with a specific embodiment of the invention. Photon source 700 includes a photonic gate 110, a measurement system 720, a non-deterministic photon source 730, and a photon storage system 740.

Non-deterministic photon source 730 sometimes emits a single photon of angular frequency $\omega_a$, but most of the time emits only the vacuum. Such a source can be, for example, an electrically triggered quantum dot or highly attenuated laser. The output of photon source 730 is measured to determine whether or not source 730 emitted a photon.

For the measurement, the output state of source 730 becomes the signal state $|S_{IN}\rangle$ that is input to photonic gate 110 for measurement. A laser or other probe source 710 simultaneously generates a probe state such as a coherent state $|\alpha_c\rangle$ containing photons of angular frequency $\omega_c$ that is split so that one spatial component forms the probe state $|P_{IN}\rangle$ that is input to photonic gate 110 with signal state $|S_{IN}\rangle$. Photodiodes 427 and 428 and signal processor 429 then determine whether signal state $|S_{IN}\rangle$ includes a single photon state using the techniques described above.

If no photon is initially present in signal state $|S_{IN}\rangle$, source 730 remains active until a single photon is detected. When the measured current from photodiode 428 confirms that signal state $|S_{IN}\rangle$ includes a single photon, the photon is stored in photon storage 740, and a gate 735 shuts off further output from photon source 730. Photon storage 740 can be a device such as a fiber loop or an EIT system capable of releasing a quantum coherent photon state matching the stored photon. The stored photon can be released from photon storage 740 to deterministically provide a single photon state on demand.

In accordance with another aspect of the invention, an EIT-based arrangement used in photonic gate 110, which causes the desired phase shift in the probe state, can also store a single photon of the signal state. In particular, the duration of the probe state can be extended to effectively slow or stop propagation of the signal photon through matter system 112 until an output photon is needed. Accordingly, a separate photon storage device 740 can be eliminated if matter system 112 serves to store the signal photon.

Figure 7B:
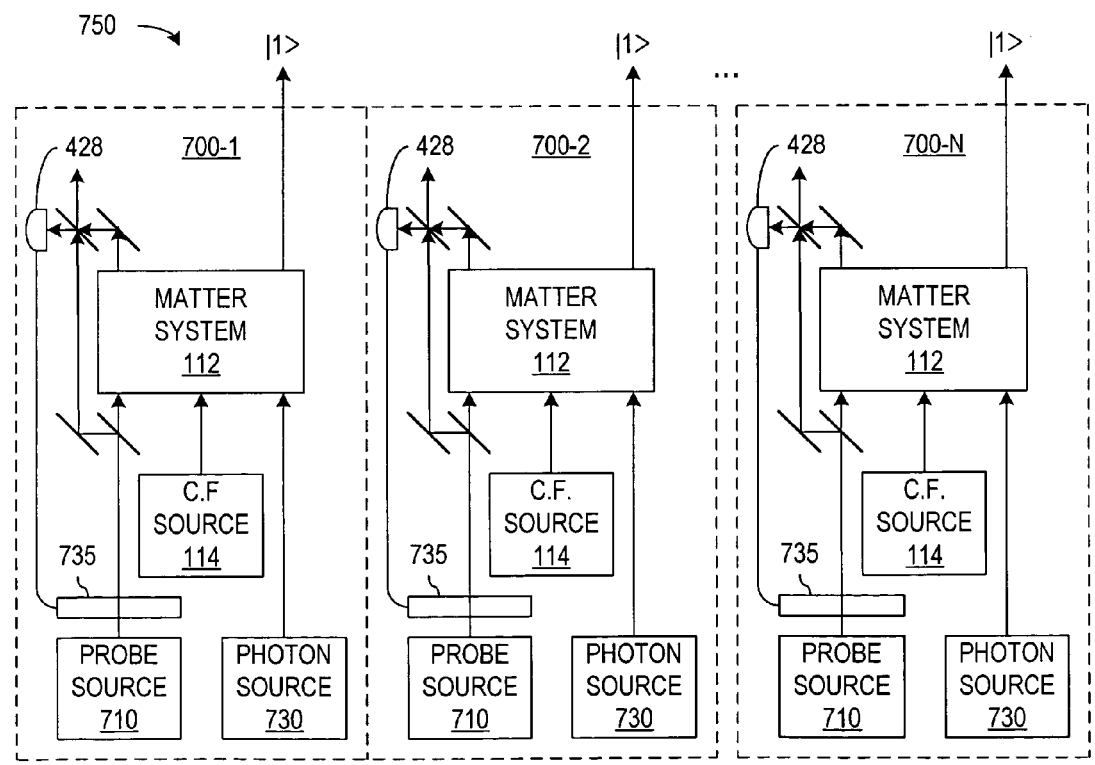
FIG. 7B is a block diagram of an N-photon source in accordance with an embodiment of the invention.

An array of N dependable single photon sources of this type can store N photons and release a user-selected number of (e.g., 0 to N) photons on demand. FIG. 7B shows an N-photon source 750 including multiple deterministic photon sources 700-1 to 700-N that can be used together to produce a photon state containing a user-selected number of photons. Each of the single photon sources 700-1 to 700-N operates in the same manner as photon source 700 of FIG. 7A to detect and store a single photon. When photon sources 700-1 to 700-N all store single photons, any or all of the photon sources 700-1 to 700-N can be commanded to release a stored photon to produce a photon state having a user selected number of photons.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A device comprising:
    a beam splitting system that splits an input photon state into modes that are distinguished by states of a characteristic of signal photons in the input photon state;
    a non-destructive measurement system capable of measuring a total number of photons in the modes without identifying a photon number for any individual one of the modes; and
    a beam combining system positioned to combine the modes after output from the non-destructive measurement system.

2. The device of claim 1, wherein the characteristic is a polarization state.

3. The device of claim 1, wherein the characteristic is a projection of orbital angular momentum onto an axis.

4. The device of claim 1, wherein the characteristic is a time bin for arrival of the signal photons.

5. The device of claim 1, wherein the characteristic is momentum of the signal photons.

6. The device of claim 1, wherein the non-destructive measurement system comprises:
    a plurality of non-destructive detectors, wherein each of the non-destructive detectors measures a different one of the modes; and
    a quantum coherent system that combines output signals of the non-destructive detectors.

7. The device of claim 6, wherein each of the non-destructive detectors comprises:
    a matter system having a first energy level and a second energy level such that each of the signal photons couples to a transition between the first energy level and the second energy level;
    a first source providing a first beam that contains photons that couple to a transition between the second energy level and a third energy level of the matter system, the first source directing the first beam to interact with the matter system;
    a second source providing a second beam that contains photons that couple to a transition between the third energy level and a fourth energy level of the matter system, the second source directing the second beam to interact with the matter system; and
    a measurement system arranged to measure a change in one of the first beam and the second beam to detect the signal photon in the matter system.

8. The device of claim 6, wherein the non-destructive detectors preserve relative differences of the modes.

9. The device of claim 1, wherein the non-destructive measurement system comprises:
    a plurality of matter systems, wherein the matter systems are in respective paths of the modes and are serially in a path of a probe photon state; and
    a measurement system arranged to measure a total change in the probe photon state caused in the matter systems.

10. The device of claim 1, wherein the non-destructive measurement system comprises:
    a first matter system in a path of a first of the modes;
    a second matter system in a path of a second of the modes;
    a source of a first probe state and a second probe state that are respectively input to the first matter system and the second matter system; and
    a phase measuring system that receives the first probe state and the second probe state after respective output from the first matter system and the second matter system.

11. The device of claim 10, wherein:
    the first probe state and the second probe state are in phase when output from the source; and
    the phase measuring system measures a phase difference between the first probe state and the second probe state after respective output from the first matter system and the second matter system.

12. The device of claim 10, wherein the phase measuring system comprises a homodyne measurement system that measures change in a phase of combination of the first probe state and the second probe state after respective output from the first matter system and the second matter system.

13. The device of claim 1, further comprising:
    a photon source that generates as the input photon state a signal that has chances of including 0 or 1 signal photon; and
    a photon storage system that stores the signal photon in response to the measurement system detecting that the signal state includes 1 photon.

14. A method for detecting a number of photons in a signal state, comprising:
- splitting the signal state into modes distinguished by values of a characteristic to be preserved;
- measuring a total number of photons in the modes without identifying a photon number for any individual one of the modes; and
- combining the modes after measurement of the total number of photons.

15. The method of claim 14, wherein measuring the total number of photons in the modes comprises:
- directing the modes into respective gates;
- directing probe states into the gates, wherein each probe state is a photon state;
- measuring an accumulation of changes in the probe states that arise in the gates; and
- inferring the total number of photons in the signal state from the changes measured.

16. The method of claim 14, wherein measuring the total number of photons in the modes comprises:
- directing the modes in parallel into respective matter systems;
- directing a probe state serially through the matter systems;
- measuring an accumulated change in the probe state arising in the matter systems; and
- inferring the total number of photons in the signal state from the accumulated change.

17. The method of claim 14, wherein measuring the total number of photons in the modes comprises:
- directing the modes in parallel into respective matter systems;
- splitting a probe state into components;
- directing the components of the probe state in parallel respectively through the matter systems;
- measuring a difference in phases of two of the components of the probe state after output of the components from the matter systems; and
- inferring the total number of photons in the signal state from the difference.

18. The method of claim 14, wherein measuring the total number of photons in the modes comprises:
- directing the modes in parallel into respective matter systems;
- directing a plurality of probe states in parallel respectively through the matter systems;
- measuring a difference in phase in the probe states after output from the matter systems; and
- inferring the total number of photons in the signal state from the difference.

* * * * *

UNITED STATES PATENT AND TRADEMARK OFFICE
CERTIFICATE OF CORRECTION

PATENT NO. : 7,038,188 B2
APPLICATION NO. : 10/836012
DATED : May 2, 2006
INVENTOR(S) : Raymond G. Beausoleil, Jr. et al.

It is certified that error appears in the above-identified patent and that said Letters Patent is hereby corrected as shown below:

In column 5, line 3, delete "gate 10" and insert -- gate 110 --, therefor.

In column 5, line 20, in Equation 2A delete " $H=\chi a\hat{a}\hat{c}^{\dagger}\hat{c}$ " and insert -- $H = \chi \hat{a}^{\dagger}\hat{a}\hat{c}^{\dagger}\hat{c}$ --, therefor.

In column 7, line 34, after "value" delete "a" and insert -- $\alpha$ --, therefor.

In column 9, line 40, after "frequency" delete "$\chi_a$" and insert -- $\omega_a$ --, therefor.

In column 11, line 1, after "parameter" delete "$(\Omega_c-\omega_{43})$" insert -- $(\omega_c-\omega_{43})$ --, therefor.

Signed and Sealed this

Sixth Day of April, 2010

David J. Kappos
*Director of the United States Patent and Trademark Office*